(12) United States Patent
Nishi

(10) Patent No.: US 10,061,316 B2
(45) Date of Patent: *Aug. 28, 2018

(54) CONTROL POLICY LEARNING AND VEHICLE CONTROL METHOD BASED ON REINFORCEMENT LEARNING WITHOUT ACTIVE EXPLORATION

(71) Applicant: Toyota Motor Engineering & Manufacturing North America, Inc., Erlanger, KY (US)

(72) Inventor: Tomoki Nishi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,020

(22) Filed: May 12, 2017

(65) Prior Publication Data

US 2018/0011488 A1 Jan. 11, 2018

Related U.S. Application Data

(63) Continuation-in-part of application No. 15/205,558, filed on Jul. 8, 2016.

(51) Int. Cl.
    *G05D 1/00* (2006.01)
    *G05D 1/02* (2006.01)
    *G06N 99/00* (2010.01)

(52) U.S. Cl.
    CPC ......... *G05D 1/0088* (2013.01); *G05D 1/0214* (2013.01); *G05D 1/0221* (2013.01); *G06N 99/005* (2013.01); *G05D 2201/0213* (2013.01)

(58) Field of Classification Search
    CPC ..... H04W 88/06; H04W 28/14; H04W 40/02; H04W 88/16; H04W 76/023; H04W 84/10; H04W 28/22; G01C 21/3407; G01C 21/3647; G01C 21/3667; G01C 21/3655; G01C 21/3492; G01C 21/3476;
    (Continued)

(56) References Cited

U.S. PATENT DOCUMENTS 6,169,981 B1 * 1/2001 Werbos .............. G05B 13/0265
                                                                706/15
6,411,871 B1   6/2002 Lin
(Continued)

OTHER PUBLICATIONS

Fairbank, "Value-gradient Learning", PhD thesis, City University London, 2014, 273 pgs.
(Continued)

*Primary Examiner* — Jelani A Smith
*Assistant Examiner* — Luis A Martinez Borrero
(74) *Attorney, Agent, or Firm* — Christopher G. Darrow; Darrow Mustafa PC

(57) ABSTRACT

A computer-implemented method is provided for autonomously controlling a vehicle to perform a vehicle operation. The method includes steps of applying a passive actor-critic reinforcement learning method to passively-collected data relating to the vehicle operation, to learn a control policy configured for controlling the vehicle so as to perform the vehicle operation with a minimum expected cumulative cost; and controlling the vehicle in accordance with the control policy to perform the vehicle operation.

13 Claims, 7 Drawing Sheets

(58) Field of Classification Search
CPC .............. G01C 21/20; G08G 1/0129; G08G 1/096844; G08G 5/0069; G08G 1/096816; G08G 1/137; G08G 1/00; G08G 1/0112; G08G 1/20; B60W 2540/26; B60W 2710/18; B60W 2710/1044; B60W 30/143; B60W 50/0097
USPC ..... 701/117, 527, 1, 123, 119, 2, 23, 4, 411, 701/418
See application file for complete search history.

(56) References Cited

U.S. PATENT DOCUMENTS

| | | | |
|---|---|---|---|
| 6,532,454 B1* | 3/2003 | Werbos | G05B 13/027 706/14 |
| 6,581,048 B1* | 6/2003 | Werbos | G05B 13/0265 250/369 |
| 6,882,992 B1* | 4/2005 | Werbos | G05B 13/027 706/16 |
| 9,134,707 B2* | 9/2015 | Vamvoudakis | G05B 13/02 |
| 9,511,767 B1* | 12/2016 | Okumura | G08G 1/0133 |
| 2010/0191391 A1* | 7/2010 | Zeng | G01S 13/723 701/1 |
| 2010/0238009 A1* | 9/2010 | Cook | G06Q 10/10 340/439 |
| 2010/0292871 A1 | 11/2010 | Schultz et al. | |
| 2012/0158301 A1* | 6/2012 | Schilling | H03M 7/40 701/533 |
| 2013/0151460 A1* | 6/2013 | Burchard | G06N 7/02 706/52 |
| 2013/0217331 A1* | 8/2013 | Manente | H04W 4/008 455/41.2 |
| 2013/0262353 A1* | 10/2013 | Vamvoudakis | G05B 13/02 706/12 |
| 2014/0074388 A1* | 3/2014 | Bretzigheimer | B60T 1/10 701/117 |
| 2014/0142948 A1* | 5/2014 | Rathi | G06F 3/167 704/270.1 |
| 2015/0370228 A1* | 12/2015 | Kohn | G06Q 50/06 700/31 |
| 2016/0092764 A1* | 3/2016 | Burchard | G06N 3/006 706/19 |
| 2016/0202670 A1* | 7/2016 | Ansari | G05B 13/026 700/45 |

OTHER PUBLICATIONS

Fairbank et al., "Value-gradient Learning", The 2012 International Joint Conference on Neural Networks (IJCNN), Jun. 2012, 8 pgs, IEEE.

Konda et al., "Actor-critic Algorithms", Neural Information Processing Systems, 1999, pp. 1008-1014, vol. 13.

Lewis et al., "Reinforcement Learning for Partially Observable Dynamic Processes: Adaptive Dynamic Programming Using Measured Output Data ", IEEE Transactions on Systems, Man, and Cybernetics—Part B: Cybernetics, Feb. 2011, pp. 14-25, vol. 41, No. 1.

Moldovan et al., "Safe Exploration in Markov Decision Processes", In Proceedings of the 29th International Conference on Machine Learning (ICML-12), 2012, pp. 1711-1718, Omnipress.

Olstam et al., "Comparison of Car-following Models", Swedish National Road and Transport Research Institute, Project VTI Meddelande, 960A, 2004, 45 pgs.

Si et al., "Handbook of Learning and Approximate Dynamic Programming", 2004, pp. 97-127, Wiley-IEEE Press.

Sutton, "Learning to Predict by the Methods of Temporal Differences", Machine Learning, 1988, pp. 9-44, vol. 3, Kluwer Academic Publishers, Boston.

Sutton et al., "Reinforcement Learning: An Introduction", 1998, 291 pgs., MIT Press, Cambridge MA.

Todorov, "Linearly-solvable Markov Decision Problems", In Advances in Neural Information Processing Systems, 2006, pp. 1369-1376, vol. 19.

Todorov, "Efficient Computation of Optimal Actions", Proceedings of the National Academy of Sciences, 2009, pp. 11478-11483, vol. 106, No. 28.

Todorov, "Eigenfunction Approximation Methods for Linearly-solvable Optimal Control Problems", Conference: In Adaptive Dynamic Programming and Reinforcement Learning, IEEE Symposium, 2009, pp. 161-168.

Todorov, "Policy Gradients in Linearly-solvable mdps", In Advances in Neural Information Processing Systems, 2010, pp. 2298-2306.

Uchibe et al., "Combining Learned Controllers to Achieve New Goals Based on Linearly Solvable mdps", International Conference: Robotics and Automation (ICRA), IEEE International Conference, 2014, pp. 5252-5259.

Watkins, et al., "Technical Note, Q-Learning", Machine Learning, 1992, pp. 279-292, vol. 8, 1992 Kluwer Academic Publishers, Boston.

Wiering et al., Reinforcement Learning, 2012, p. 31, vol. 12, Springer. ISBN: 978-3-642-27644-6 (Print) 978-3-642-27645-3 (Online).

Wei et al., "Autonomous Vehicle Social Behavior for Highway Entrance Ramp Management", IEEE Intelligent Vehicles Symposium (IV), Jun. 23-26, 2013, Gold Coast, Australia, 7 pages.

Wei et al., "A Prediction- and Cost Function-Based Algorithm for Robust Autonomous Freeway Driving", IEEE Intelligent Vehicles Symposium, University of California, Jun. 21-24, 2010, 6 pages.

Cunningham et al., "MPDM: Multipolicy Decision-Making in Dynamic, Uncertain Environments for Autonomous Driving", IEEE International Conference on Robotics and Automation (ICRA), Washington State Convention Center, Seattle, WA, May 26-30, 2015, 8 pages.

* cited by examiner

FIG. 4
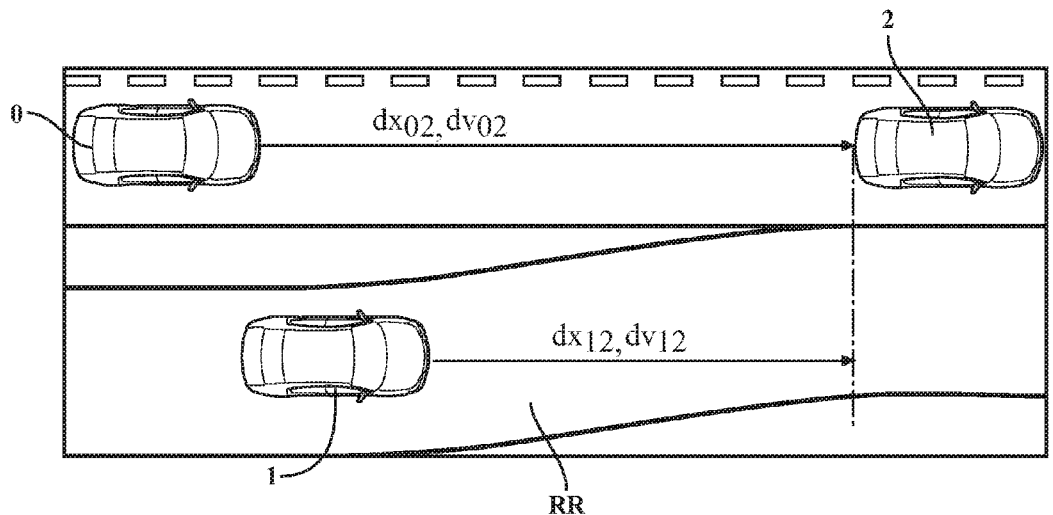
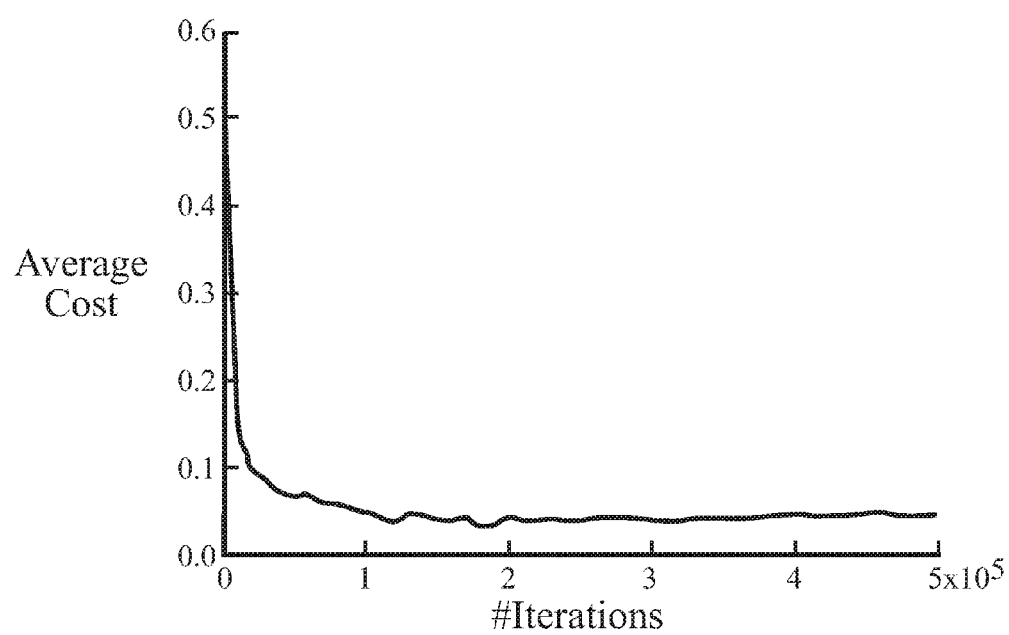
FIG. 5

US 10,061,316 B2

CONTROL POLICY LEARNING AND VEHICLE CONTROL METHOD BASED ON REINFORCEMENT LEARNING WITHOUT ACTIVE EXPLORATION

CROSS-REFERENCE TO RELATED APPLICATIONS

This application is a continuation-in-part of, and claims the benefit of, U.S. application Ser. No. 15/205,558, filed on Jul. 8, 2016.

TECHNICAL FIELD

The present invention relates to methods for autonomously controlling a vehicle and, more particularly, to a reinforcement learning method for revising and/or optimizing a control policy usable for autonomously controlling an operation of a vehicle.

BACKGROUND

Model-free reinforcement learning (RL) techniques may be employed in certain types of systems to determine an optimal system control policy by actively exploring an environment. However, it may be challenging to apply conventional RL approaches to control policies usable for autonomous control of vehicles due to potentially negative consequences associated with extensive active exploration of all the actions available to the vehicle. In addition, conducting active exploration in a manner needed to help ensure vehicle safety may exact a high computational cost. The use of model-based RL techniques as an alternative may require an accurate system dynamics model of the environment in which the vehicle operates. However, the complex environment in which an autonomous vehicle operates may be very difficult to model accurately.

SUMMARY

In one aspect of the embodiments described herein, a computer-implemented method for autonomously controlling a vehicle to perform a vehicle operation is provided. The method includes steps of applying a passive actor-critic reinforcement learning method to passively-collected data relating to the vehicle operation, to learn a control policy configured for controlling the vehicle so as to perform the vehicle operation with a minimum expected cumulative cost; and controlling the vehicle in accordance with the control policy to perform the vehicle operation.

In another aspect of the embodiments described herein, a computer-implemented method for optimizing a control policy usable for controlling a system to perform an operation is provided. The method includes steps of providing a control policy usable for controlling the system, and applying a passive actor-critic reinforcement learning method to passively-collected data relating to the operation to be performed, to revise the control policy such that the control policy is operable to control the system to perform the operation with a minimum expected cumulative cost.

In another aspect of the embodiments described herein, a computing system configured for optimizing a control policy usable for autonomously controlling a vehicle to perform a vehicle operation is provided. The computing system includes one or more processors for controlling operation of the computing system, and a memory for storing data and program instructions usable by the one or more processors. The memory is configured to store computer code that, when executed by the one or more processors, causes the one or more processors to (a) receive passively collected data relating to the vehicle operation; (b) determine a Z-value function usable for estimating a cost-to-go; (c) in a critic network in the computing system, determine a Z-value using the Z-value function and samples of the passively-collected data, and estimate an average cost under an optimal policy using samples of the passively-collected data; (d) in an actor network in the computing system, revise the control policy using samples of the passively-collected data, a control dynamics for the system, a cost-to-go, and a control gain; and (e) iteratively repeat steps (c) and (d) until the estimated average cost converges.

BRIEF DESCRIPTION OF THE DRAWINGS

FIG. 4 is a schematic view of an arrangement of vehicles employed in an example of a freeway-merge control policy optimization, using a method in accordance with an embodiment described herein.

FIG. 5 is a graphical representation of the optimization performed in relation to the arrangement of vehicles shown in FIG. 4.

DETAILED DESCRIPTION

Embodiments described herein relate to a computer-implemented method for applying a passive actor-critic (pAC) reinforcement learning method to passively-collected data relating to a vehicle operation, in order to learn a control policy configured for autonomously controlling a vehicle so as to perform the vehicle operation with a minimum expected cumulative cost. The vehicle may then be controlled by a computing system in accordance with the control policy to perform the vehicle operation. The pAC method does not require an accurate systems dynamics model of the environment in which the vehicle is operating during the merging operation in order to learn the control policy. The pAC method also does not use active exploration of the environment to learn the control policy (which may involve, for example, performing actions and monitoring results of the actions to determine and modify the control policy). Instead of active exploration, the pAC method described herein uses data collected passively, a partially known system dynamics model, and a known control dynamics model of the vehicle being controlled. In a particular embodiment, the pAC method may be used to learn a control policy usable for controlling the vehicle so as to merge the vehicle into a traffic lane midway between a second vehicle and a third vehicle traveling in the traffic lane.

In the context of this disclosure, "online" means that the computing system may learn, and actor and critic network parameters may be computed and updated, as the system operates (e.g. as the vehicle moves). Determining and updating actor and critic parameters using online solutions may allow for changing vehicle and system dynamics. Also, an autonomous operation is an operation that is performed autonomously.

Figure 1:
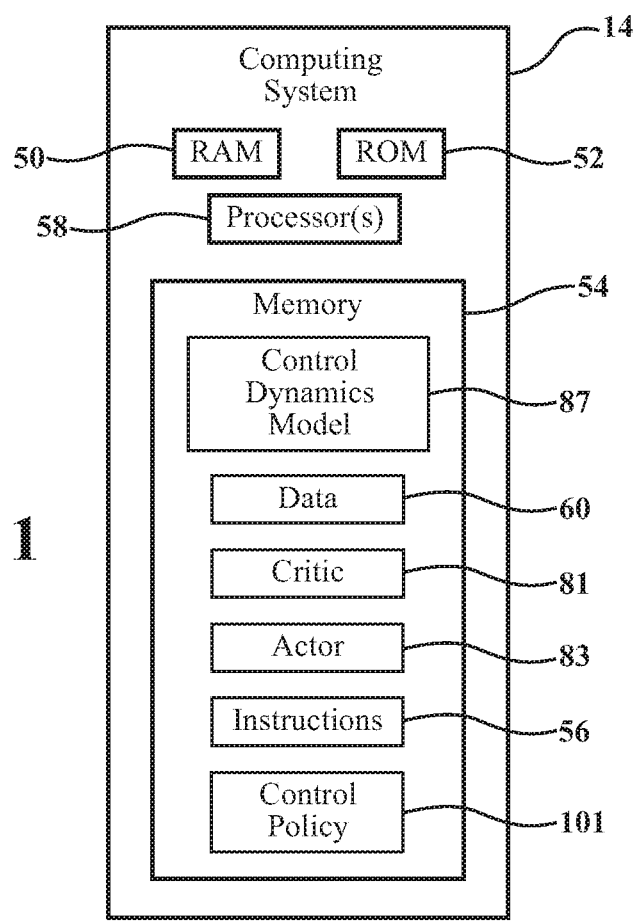
FIG. 1 is a block diagram of a computing system configured for determining control inputs to a system (for example, an autonomous vehicle), and for revising and/or optimizing a system control policy, in accordance with an embodiment described herein.

FIG. 1 is a block diagram of a computing system 14 configured for implementing methods in accordance with various embodiments disclosed herein. More specifically, in at least one embodiment, computing system 14 may be configured to determine control inputs in accordance with a method described herein. The computing system may also be configured for revising and/or optimizing a control policy usable for controlling a system (for example, an autonomous vehicle) to autonomously perform a specific operation or task. The control policy may be revised until it is considered to be optimized. For purposes of autonomously controlling the vehicle to perform the operation or task, operation of the computing system may be optimized by optimizing the control policy used for performing the operation or task.

An optimal or optimized control policy may be a control policy configured for controlling the vehicle so as to perform the vehicle operation with a minimum expected cumulative cost. The optimal control policy may be learned through revising an initial control policy by applying a passive actor-critic (pAC) reinforcement learning method to passively-collected data relating to the vehicle operation. The pAC reinforcement learning method may be applied to the initial control policy to iteratively optimize the parameter values of the control policy. Parameters of the initial control policy may be initialized to random values. In one or more arrangements, the optimal control policy is deemed to be learned when an average cost associated with the policy has converged. The average cost may be deemed to have converged when the value of the average cost does not vary outside a predetermined range or tolerance zone for a predetermined number of iterations of the pAC method. For example, in the embodiment illustrated in FIG. 5, the average cost has achieved a value of about 0.3 after 20,000 iterations. If the average cost does not vary from 0.3 by more than a certain value in either direction for a predetermined number of iterations after 20,000 iterations, the control policy may be considered optimized. The vehicle may then be controlled in accordance with the optimized control policy to perform the vehicle operation. Use of the optimized control policy to control the vehicle to perform the vehicle operation should then result in performance of the vehicle operation with a minimum expected cumulative cost.

In at least one embodiment, the computing system may be incorporated into a vehicle and may be configured to revise and optimize the control policy directed to controlling operation of the vehicle. The information (for example, data, instructions, and/or other information) required by the computing system to revise and/or optimize the control policy may be received from and/or gathered by any suitable means, for example, from vehicle sensors or from extra-vehicular sources such as remote databases via a wireless connection. In some embodiments, at least some of the information (for example, data) required by the computing system to revise and/or optimize the control policy may be provided to the computing system (for example, as data or other information stored in a memory) prior to operation of the vehicle. The computing system may also be configured to control the vehicle in accordance with the revised or optimized control policy, to perform the associated autonomous vehicle operation.

In at least one embodiment, the computing system may be located remotely from the vehicle (for example, as a stand-alone computing system), and may be configured to revise and/or optimize the control policy remotely from the vehicle. The optimized or revised control policy generated by the remote computing system may then be loaded or installed into a vehicle computing system for deployment with the vehicle, to control the vehicle in an actual traffic environment.

Referring to FIG. 1, the computing system 14 may include one or more processors 58 (which could include at least one microprocessor) for controlling overall operation of the computing system 14 and associated components, and which executes instructions stored in a non-transitory computer readable medium, such as the memory 54. In the context of this disclosure, a computer-readable storage medium may be any tangible medium that can contain, or store a program for use by or in connection with an instruction execution system, apparatus, or device. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other.

In some embodiments, the computing system 14 may include RAM 50, ROM 52, and/or any other suitable form of computer-readable memory. The memory 54 may comprise one or more computer-readable memories. The memory or memories 54 can be a component of the computing system 14, or the memory or memories can be operatively connected to the computing system 14 for use thereby. The term "operatively connected," as used throughout this description, can include direct or indirect connections, including connections without direct physical contact.

In one or more arrangements, the computing system 14 described herein can incorporate artificial or computational intelligence elements, e.g., neural network or other machine learning algorithms. Further, in one or more arrangements, the hardware and/or software elements configured for performing particular functions or operations described herein may be distributed among a plurality of elements and/or locations. In addition to computing system 14, the vehicle may incorporate additional computing systems and/or devices (not shown) to augment or support the control functions performed by computing system 14, or for other purposes.

The memory 54 may contain data 60 and/or instructions 56 (e.g., program logic) executable by the processor(s) 58 to execute various functions. Data 60 may include passively collected data relating to the vehicle operation to be controlled by the control policy. In addition, passively collected data may be provided for (or reside on) other sources for use by the computing system 14. Passively collected data may be defined as data which is not collected from active exploration. Passively-collected data relevant to a freeway merging operation may include, for example, the speeds and accelerations of vehicles traveling in the right-most lane of the freeway proximate an on-ramp, and the speeds and accelerations of sample vehicles traveling along the on-ramp and entering the right-most lane. One example of passively collected data is the dataset described in http://www.fhwa.dot.gov/publications/research/operations/06137/, which describes the acquisition of vehicle trajectories around the entrance of a freeway using cameras mounted on the top of a building. In another example, passively collected data may include data collected by vehicle sensors responsive to a maneuver executed by a human driver. Data may be collected and provided to a computing system relating to maneuvers executed by a human driver, the vehicle environmental conditions under which the maneuver was executed, and events occurring in the vehicle surroundings subsequent to the maneuver and/or in response to the maneuver. Alternatively, when the computing system is installed in a vehicle, the computing system 14 may be configured to gather and/or receive such passively collected data for online revision and/or optimization of one or more vehicle control policies (such as control policy 101).

A vehicle control dynamics model 87 may be a stimulus-response model describing how a vehicle responds to various inputs. The vehicle control dynamics model 87 may be used to determine (using passively-collected data) a vehicle control dynamics B(x) for the vehicle in given vehicle state x. The state cost function q(x) is the cost or the vehicle being in the state x, and may be leaned based on known methods such as inverse reinforcement learning. The state cost q(x) and the vehicle control dynamics B(x) may be used for both revising and optimizing a control policy 101 as described herein. The vehicle control dynamics model 87 for any given vehicle may be determined and stored in a memory, such as memory 54.

Referring again to FIG. 1, embodiments of the computing system may also include two learning systems or learning networks, and actor network (or "actor") 83 and a critic network (or "critic") 81, that interact with each other. These networks may be implemented using artificial neural networks (ANN's), for example. For purposes described herein, a control policy 101 (also denoted by the variable π) may be defined as a function or other relationship that specifies or determines an action u to be taken by a vehicle in response to each state x of a set of states that the vehicle may be in. Thus, for each state x of the vehicle during execution of an autonomous operation, the vehicle may be controlled to perform an associated action u=π(x). Therefore, the control policy controls operation of the vehicle to autonomously perform an associated operation, for example, freeway merging. The actor 83 may operate on the control policy to revise and/or optimize the policy using information received from the critic and other information. A vehicle operation as autonomously controlled by a control policy may be defined as a driving maneuver or set of driving maneuvers performed to accomplish a specific purpose, such as merging onto a freeway or changing lanes.

The computing system 14 may be configured to execute a novel semi-model-free RL method (referred to herein as the passive actor-critic (pAC) method) usable for control policy revision and optimization. In this method, a critic learns an evaluation function for various states of the vehicle and an actor improves a control policy without active exploration, instead using data collected passively and a known vehicle control dynamics model. The method uses a partially-known system dynamics model, thereby obviating the need for active exploration. The method does not require knowledge of the uncontrolled dynamics of the vehicle environment or transitional noise levels. This is feasible, for example, in the context of autonomous vehicles, where samples of how the environment noisily evolves are available but may be difficult to actively explore with the vehicle sensors.

In a particular embodiment described herein, the vehicle operation to be controlled by the control policy is an operation for merging the vehicle into a traffic lane between a second vehicle and a third vehicle traveling in the traffic lane. The control policy may be configured for controlling the vehicle to merge the vehicle midway between the second vehicle and the third vehicle.

Embodiments of the computing system 14 described herein determine states x(t) of a system (for example, a vehicle) by measuring, receiving and/or accessing various types of input and output information. For example, data may be measured using sensors coupled to, or otherwise in communication with, the system. The computing system 14 may determine a control input u to achieve stability and desired motion of the vehicle characterized by equation (1) and also to minimize an energy-based cost function as described in equation (2).

For purposes of revising and optimizing a control policy, a discrete-time stochastic dynamical system may be defined with a state $x \in \mathbb{R}^n$ and a control input $u \in \mathbb{R}^m$ as follows:

$$\Delta x = A(x_t)\Delta t + B(x_t)u_t\Delta t + C(x_t)d\omega \qquad (1)$$

where ω(t) is Brownian motion, $A(x_t)$, $B(x_t)u_t$ and $C(x_t)$ denote the passive dynamics, vehicle control dynamics, and the transition noise level, respectively. Δt is a step size of time. This type of system arises in many situations (e.g., models of most mechanical systems conform to these dynamics). The functions A(x), B(x), and C(x) depend on the specific system being modeled, as should be appreciated. The passive dynamics include changes in the environment of a vehicle which are not the result of control inputs to the vehicle systems.

In the method and system described herein, a Markov decision process (MDP) for a discrete-time dynamical system is a tuple $\langle \mathcal{X}, \mathcal{U}, P, R \rangle$, where $\mathcal{X} \subseteq \mathbb{R}^n$ and $\mathcal{U} \subseteq \mathbb{R}^m$ are state and action spaces. $P := \{p(y|x, u)|x, y \in \mathcal{X}, u \in \mathcal{U}\}$ is a state transition model due to action and $R := \{r(x, u)|x \in \mathcal{X}, u \in \mathcal{U}\}$ is an immediate cost function with respect to state x and action u. As previously described, a control policy u=π(x) is a function that maps from a state x to an action u. The cost-to-go function (or value function) $V^\pi(x)$ under the policy π, which is the expected cumulative cost, is defined as follows under the infinite horizon average-cost optimality criterion:

$$V^\pi(x_t) := \sum_{k=1}^{\infty} p(x_k, \pi(x_k))r(x_k, \pi(x_k))\Delta t - V_{avg}^\pi$$

$$V_{avg}^\pi := \lim_{N \to \infty} \frac{1}{N\Delta t} \sum_{k=1}^{\infty} p(x_k, \pi(x_k))r(x_k, \pi(x_k))\Delta t$$

where $V_{avg}^\pi$ is the average cost, k is the time index, and Δt is the time step. An optimal cost-to-go function satisfies the following discrete time Hamilton-Jacobi-Bellman equation:

$$V_{avg}^\pi + V^\pi(x_t) = \min_{u_k} Q^\pi(x_k, u_k), \quad (2)$$

where $Q^\pi(x_k, u_k) := r(x_k, u_k)\Delta t + \mathcal{G}[V^\pi](x_k)$, and $\mathcal{G}[V^\pi](x_k) := \int_X p(y|x_k, \pi) V^\pi(y) dy$ where $Q^\pi(x, u)$ is an action-value function and $\mathcal{G}[\cdot]$ is an integral operator. The goal of the MDP is to find the control policy that minimizes the average cost over the infinite horizon, according to the following relationship:

$$\pi^*(x_k) = \arg\min_\pi \mathbb{E}[V_{avg}^\pi]$$

Hereafter, values under the optimal control policy may be represented with the superscript * (e.g., $V^*, V^*_{avg}$).

Linear Markov decision processes (L-MDP's) for discrete-time dynamical systems are a subclass of the general Markov decision processes with the benefit that exact solutions may be quickly obtained for continuous state and action spaces. Under structured dynamics and separated state and control costs, a Bellman equation may be restructured as a linearized differential equation, for which the solution reduces to finding the linear Eigenfunction of the combined state cost and uncontrolled dynamics. Subsequently, the cost-to-go function (or value function) for the L-MDP may be efficiently obtained with optimization methods such as quadratic programming (QP) when an accurate dynamics model is available.

A linear formulation of the Markov Decision Process may be used to define a control cost and to add a condition on the vehicle dynamics as shown below:

$$r(x_k, u_k) := q(x_k) + KL(p(x_{k+1}|k_k) \| p(x_{k+1}|x_k, u_k)) \quad (3)$$

$$p(x_{k+1}|x_k) = 0 \Rightarrow \forall u_k, p(x_{k+1}|k_k, u_k) = 0 \quad (4)$$

Here, $q(x) \geq 0$ is the state-cost function, $p(x)$ is a state transition model due to action, and $KL(\cdot\|\cdot)$ is the Kullback-Leibler (KL) divergence. Equation (3) relates the cost of an action to the amount of stochastic effect it has on the system and adds it to the state cost. The second condition ensures that no action introduces new transitions that are not achievable under passive dynamics. The stochastic dynamical system represented by Eq. (1) satisfies the assumption naturally.

The Hamilton-Jacobi-Bellman equation (Eq. (2)) can be recast in L-MDP form to a linearized differential equation for an exponentially transformed cost-to-go function (hereafter referred to as a linearized Bellman equation):

$$Z_{avg} Z(x_k) = \exp(-q(x_k)\Delta t)\mathcal{G}[Z](x_{k+1}), \quad (5)$$

$$Z(x) := \exp(-V^*(x)),$$

$$Z_{avg} := \exp(-V^*_{avg}),$$

$$p(x_{k+1}|x_k, \pi_k^*) = \frac{p(X_{k+1}|X_k) Z(x_{k+1})}{\mathcal{G}[Z](x_{k+1})},$$

where $Z(x)$ and $Z_{avg}$ are an exponentially transformed cost-to-go function called the Z-value function and an average cost under an optimal policy, respectively. A Z-value may be a particular value of the Z-value function $Z(x)$ for a corresponding value of the input parameter x. Because the state transition in (Eq. (1)) is Gaussian, the KL divergence between the controlled and passive dynamics may be represented as:

$$KL(p(x_{k+1}|x_k) \| p(x_{k+1}|x_k, u_k)) = \frac{1}{2\rho(x_k)} u_k^T u_k, \quad (6)$$

$$\frac{1}{\rho(x_k)} := B(x_k)^T (C(x_k)^T C(x_k))^{-1} B(x_k),$$

Then, an optimal control policy for an L-MDP system may be represented as:

$$\pi^* = -\rho(x_k) B(x_k)^T V_{x_k}, \quad (7)$$

where $V_{x_k}$ is a partial derivative of the cost-to-go function V with respect to x at $x_k$.

and the parameter $\rho(x_k)$ is a control gain which represents a number of times the vector represented by $B(x_k)^T V_k$ multiplies. The Z-value and the average cost may be derived from the linearized Bellman equation by solving an Eigenvalue or Eigenfunction problem when the system dynamics are fully available.

Solution of the Eigenvalue problem is discussed by Todorov, in "Linearly-solvable Markov Decision Problems", published in *Advances in Neural Information Processing Systems*, 2006, pgs. 1369-1376, Vol. 19, which is incorporated herein by reference in its entirety. Solution of the Eigenfunction problem is discussed by Todorov, in "Eigenfunction Approximation Methods for Linearly-solvable Optimal Control Problems", published in *Conference: In Adaptive Dynamic Programming and Reinforcement Learning, IEEE Symposium*, 2009, pgs. 161-168, which is also incorporated herein by reference in its entirety.

Embodiments of the computing system 14 described herein include two learning systems or learning networks, an actor network (or "actor") 83 and critic network (or "critic") 81, that interact with each other. These networks may be implemented using artificial neural networks (ANNs).

In one or more arrangements, the actor 83 is implemented as an inner loop feedback controller and the critic 81 is implemented as an outer loop feedback controller. Both may be located in a feed forward path with respect to vehicle actuatable mechanisms or controls which are operable to effect the control commands.

An iteration may be defined as an update of the critic and actor parameters (such as weights ω for the critic and μ for the actor). In addition, updating of the critic network parameters may be performed when the vehicle is in motion. In the methods described herein, wherein the only data that is used during update of the critic network and actor network parameters is passively-collected data.

The critic 81 determines, using a state as reflected in samples of passively collected data and a state cost, an estimated average cost, and an approximated cost-to-go function that produces a minimum value for a cost-to-go of the vehicle when applied by an actor network. Using a vehicle state reflected in samples of passively collected data and a state cost $q(x)$ received from the vehicle control dynamics model 87, the critic 81 evaluates a current state $x_k$ of the vehicle and an estimated next state $x_{k+1}$, and the state cost $q_k$ under an optimal policy using samples of the passively-collected data. The critic 81 also uses the linearized version of the Bellman equation previously described (equations (5)) to determine an approximated cost-to-go function $\hat{Z}(x)$ (Z-value function) and an associated estimated Z-value for the current state, and to generate an estimated average cost $\hat{Z}_{ag}$ for use by the actor 83. The estimated next state $x_{k+1}$, may be calculated using the passively-collected data and the vehicle dynamics model 87.

For purposes of estimating the Z-value, a linear combination of weighted radial basis functions (RBF's) may be used to approximate the Z-value function:

$$Z(x) \approx \hat{Z}(x) := \sum_{j=0}^{N} \omega_j f_j(x)$$

where $\omega$ are the weights, $f_j$ are j-th RBFs, and N is the number of RBFs. The basis functions may be suitably chosen depending on the nonlinear dynamics of the vehicle system. The Z-value may be approximated using the approximated Z-value function and samples of the passively-collected data.

Prior to approximating the Z-value function using a linear combination of weighted radial basis functions, the weights used in the weighted radial basis functions may be optimized. For use in the radial basis functions, the weights $\omega$ may be optimized by minimizing the least square error between an exponentiated true cost-to-go (or Z-value) and an estimated cost-to-go. Let $Z(x_k)$ and $Z_{avg}$ be the true Z-value and the true average cost, and $\hat{Z}_k$, $\hat{Z}_{avg}$ their estimated counterparts, respectively:

$$\min_{\omega, \hat{Z}_{avg}} \frac{1}{2} \sum_D \left( \hat{Z}_{avg} \hat{Z}_k - Z_{avg} Z_k \right)^2, \quad (8)$$

$$\text{s.t } \sum_{i=0}^{N} \omega_i = C, \, \forall \, i \omega_i \geq 0, \, \forall \, x \hat{Z}_{avg} \hat{Z}(x) \leq 1, \quad (9)$$

where C is a constant value used to avoid convergence to a trivial solution $\omega = 0$. The second and third constraints are needed to satisfy $\forall x, 0 < Z_{avg} Z(x) \leq 1$, \which comes from Eq. (5) and $\forall x, q(x) \geq 0$.

Prior to optimizing the weights, the weights used in the weighted radial basis functions may be updated. The weights $\omega$ may be updated prior to optimization, and the weights and average cost $\hat{Z}_{avg}$ used by the critic network may be updated prior to use in the iteration step based on Lagrangian-relaxed Temporal Difference (TD) learning by approximating the error between true and estimated cost-to-go with an approximated temporal difference error $e_k$ determined as follows from the linearized Bellman equation (LBE) (equation (5)) because the true cost-to-go and the true average cost may not be determined with the information used for the pAC method:

$$\hat{Z}_{avg} \hat{Z} - Z_{avg} Z_k \approx e_k := \hat{Z}_{avg} \hat{Z}_k - \exp(-q_k) \hat{Z}_{k+1} \quad (10)$$

$$\tilde{\omega}^{i+1} = \omega^i - \alpha_1^i e_k Z_{avg} f_k$$

$$\omega^{i+1} = \tilde{\omega}^i + \lambda_1 + \sum_{l=0}^{N} \lambda_{2l} \delta_{jl} + \lambda_3 \hat{Z}_{avg} f_k \quad (11)$$

$$\hat{Z}_{avg}^{i+1} = \hat{Z}_{avg}^i - \alpha_2^i e_k \hat{Z}_k \quad (11A)$$

where $\alpha_1^i$ and $\alpha_2$ are learning rates and $e_k$ is TD error for L-MDPs. $\delta_{ij}$ denotes the Dirac delta function. The superscript i denotes the number of iterations. $\lambda_1$, $\lambda_2$, $\lambda_3$ are Lagrangian multipliers for constraint Eq. (9). $\omega$ is updated to minimize the error with Eq. (10) and to satisfy the constraints with Eq. (11).

Values of the multipliers are calculated by solving the following equation.

$$\begin{bmatrix} \sum_j f_j & f_0 \cdots f_N & f^T f \\ 1 & 1 \cdots 0 & f_0 \\ \vdots & \ddots & \vdots \\ 1 & 0 \cdots 1 & f_N \\ N & 1 \cdots 1 & \sum_j f_j \end{bmatrix} \begin{bmatrix} \lambda_1^i \\ \lambda_2^i \\ \lambda_3^i \end{bmatrix} = \begin{bmatrix} c - \sum_j \tilde{\omega}^j \\ -\tilde{\omega}_0^i \\ \vdots \\ -\tilde{\omega}_N^i \\ 1 - \hat{Z}_{avg} \hat{Z}_k \end{bmatrix}$$

In some cases, a subset of constraints may not be valid. In such cases, the multipliers for those constraints are set to zero and the multipliers for the remaining valid constraints are obtained. The critic updates the parameters using a state transition sample under passive dynamics $(x_k, x_{k+1})$ and state cost $q_k$, which is independent of control policy. The weights $\omega$, the estimated Z-value $\hat{Z}$, and the average cost $\hat{Z}_{avg}$ may be updated online according to the equations (10)-(11A), while the vehicle is in motion.

An actor 83 in the computing system and operatively coupled to the critic network may determine a control input to apply to the vehicle that produces the minimum value for the cost-to-go. Using the estimated cost-to-go $\hat{Z}$ and estimated average cost $\hat{Z}_{avg}$ generated by the critic, a state cost $q(x)$, control dynamics information $B(x)$ for the current state as determined from the vehicle control dynamics model 87, and the current state and estimated next state of the vehicle as used by the critic to estimate the cost-to-go function $2(x)$, and to generate the estimated average cost $\hat{Z}_{avg}$, the actor 83 may determine the control input. The control input may be used to revise the control policy $\pi$. In particular embodiments, the policy $\pi$ is iteratively revised in the manner described herein until convergence, at which time it is deemed to be optimized. The actor improves or revises the control policy using the standard Bellman equation and without active exploration. The control dynamics may be determined from a known control dynamics model for the vehicle.

The actor 83 may also apply the control inputs $u(x)$ to the vehicle systems in real time to autonomously perform a desired operation (for example, freeway merging, lane changing, etc.). In some embodiments disclosed herein, the actor 83 may be embodied in an inner loop feedback controller and the critic 81 may be embodied in an outer loop feedback controller. Both controllers may be located in a feed forward path with respect to the vehicle actuatable controls.

The actor 83 may improve or revise a control policy by estimating a control gain $\rho(x_k)$ using the estimated values from the critic (e.g., $\hat{Z}$ and $\hat{Z}_{avg}$), a sample under passive dynamics, and a known control dynamics $B_k$. Revising the control policy may include steps of approximating a control gain, optimizing the control gain to provide an optimized control gain, and revising the control policy using the optimized control gain.

The control gain $\rho(x_k)$ may be approximated learned with a linear combination of weighted radial basis functions:

$$\rho(x; \mu) \approx \hat{\rho}(x; \mu) := \sum_j^M \mu_j g_j(x) \quad (12)$$

where $\mu_j$ is the weight for the j-th radial basis function $g_j$. M is the number of radial basis functions. $\rho(x_k)$ may be optimized by minimizing least square error between a cost-to-go and an action-state value.

$$\min_{\mu} \frac{1}{2} \sum_{D} \left( \hat{Q}_k - V_k^* - V_{avg}^* \right)^2$$

where $V^*$, $V^*_{avg}$, and $\hat{Q}$ are the true cost-to-go function, average cost, and estimated action-state value under the optimal control policy. The optimal control policy can be learned by minimizing the objective function because the true action-value cost equals $V^*+V^*_{avg}$ if and only if a policy is the optimal policy. $\hat{Z}_k$ and $\hat{Z}_{avg}$ may be used to determine $\hat{V}_k$ and $\hat{V}_{avg}$ when updating the control gain $\rho(x_k)$, according to the following relationships:

$$\hat{V}_k = -\log(\hat{Z}_k)$$

$$\hat{V}_{avg} = -\log(\hat{Z}_{avg})$$

Prior to optimizing the control gain, a control input may be determined, and value of an action-value function Q may be determined using the control input, samples of the passively-collected data, and the approximated control gain. Prior to approximating the control gain using a linear combination of weighted radial basis functions, the weight μ used in the weighted radial basis functions may be updated.

The weight μ may be updated with the approximate temporal difference (TD) error $d_k$ defined below:

$$\mu^{i+1} = \mu^i - \beta^i d_k L_{k,k+1} g_k,$$

$$d_k \approx q_k \Delta t - \hat{V}_{k+1} + \hat{V}_k + \hat{V}_{avg} + L_{k,k+1} \rho_k,$$

$$L_{k,k+1} := (0.5 \hat{V}_k - \hat{V}_{k+1})^T B_k B_k^T \hat{V}_k \Delta t$$

where $\beta^i$ is a learning rate and $L_{k,k+1}$ is a shorthand version of the term L $(x_k, x_{k+1})$.

The standard Bellman equation may be approximated to determine the error $d_k$ because the true cost-to-go and the true average cost cannot be calculated.

$$\hat{Q}_k - V_k^* - V_{avg}^* \approx d_k := \hat{Q}_k - \hat{V}_k - \hat{V}_{avg}$$

$$\hat{Q} \approx q_k \Delta t + \frac{0.5 \Delta t}{\hat{\rho}_k} u_k^T u_k + \hat{V}(x_{k+1} + B_k u_k \Delta t)$$

$$u_k \approx -\hat{\rho}_k B_k^T \hat{V}_k,$$

where $x_{k+1}$ is a next state under passive dynamics and $x_{k+1} + B_k u_k \Delta t$ is a next state under controlled dynamics with action $u_k$. The estimated cost-to-go, the average cost and derivative values of them can be calculated by utilizing the estimated Z-value and the average Z-value cost from the critic. Moreover $\hat{V}(x_{k+1}+B_k u_k \Delta t)$ may be approximated to linearize the TD error with respect to μ by:

$$\hat{V}(x_{k+1}+B_k u_k \Delta t) \approx \hat{V}_{k+1} + V_{x_{k+1}}^T B_k u_k \Delta t.$$

This procedure improves the policy without active exploration by using a state transition sample $(x_k, x_{k+1})$ under passive dynamics, a state cost $q_k$, and the control dynamics $B_k$ in the give state. Standard actor-critic methods optimize a policy with active exploration. With these actor and critic functions defined, the computing system 14 is able to implement semi-model-free reinforcement learning using L-MDP's.

In the methods described herein, the policy is optimized with a parameter which is learned using samples of passively-collected data and knowledge of the vehicle control dynamics, by minimizing the error between a cost-to-go and an action-state value. The methods described herein enable an optimal policy to be determined with the vehicle's own dynamics model, which is usually available to control the car. The methods also use passively-collected data relating to maneuvers of surrounding vehicles whose dynamics models are usually not known. In addition, using the methods described herein, the passive dynamics $A(x_t)$ of the vehicle environment and the transition noise level and $C(x_t)$ do not need to be known to determine the optimum control policy.

In another aspect, and as described herein, a computer-implemented method is provided for optimizing a control policy usable for controlling a system to perform an operation. The method may include steps of providing a control policy usable for controlling the system; and applying a passive actor-critic reinforcement learning method to passively-collected data relating to the operation to be performed, to revise the control policy such that the control policy is operable to control the system to perform the operation with a minimum expected cumulative cost. The step of applying a passive actor-critic reinforcement learning method to passively-collected data may include steps of: (a) in a critic network in the computing system, estimating a Z-value using samples of the passively-collected data, and estimating an average cost under an optimal policy using samples of the passively-collected data; (b) in an actor network in the computing system, revising the control policy using samples of the passively-collected data, a control dynamics for the system, a cost-to-go, and a control gain; (c) updating parameters used in revising the control policy and in estimating the Z-value and the average cost under an optimal policy; and (d) iteratively repeating steps (a)-(c) until the estimated average cost converges.

FIGS. 6-9 are flow diagrams illustrating a computer-implemented method for applying a passive actor-critic reinforcement learning method to passively-collected data relating to a vehicle operation to learn a control policy configured for controlling the vehicle so as to perform the vehicle operation with a minimum expected cumulative cost, in accordance with an embodiment described herein.

Figure 6:
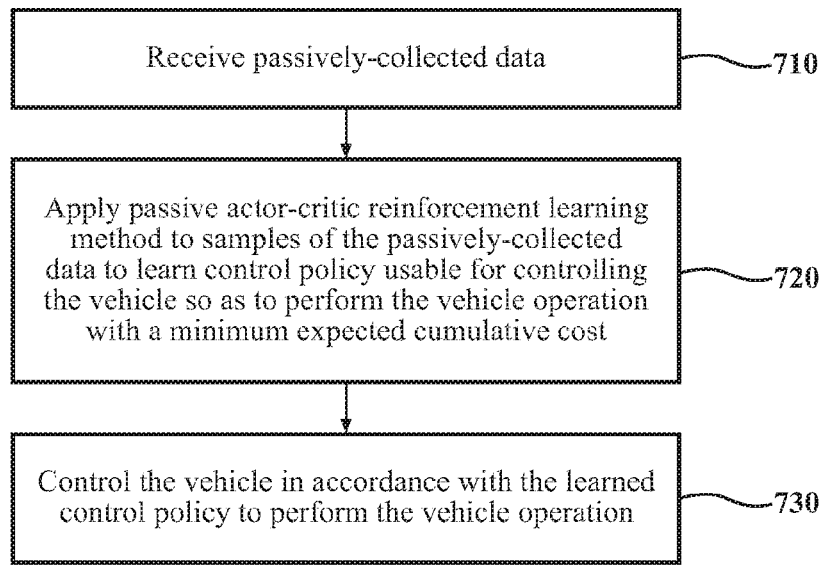
FIG. 6 is a flow diagram illustrating implementation of a method for applying a passive actor-critic reinforcement learning method to learn a control policy configured for controlling the vehicle, and for controlling a vehicle using the learned control policy.

Referring to FIG. 6, in block 710, the processor 58 may receive passively-collected data relating to a vehicle operation to be performed. The passively-collected data may be received from memory 54 and/or from a source external to the computing system 14.

In block 720, the processor and/or other elements of the computing system 14 may iteratively apply a passive actor-critic (PAC) reinforcement learning method as described herein to samples of the passively-collected data. By application of the PAC method, a control policy may be learned which enables a vehicle to be controlled to perform the vehicle operation with a minimum expected cumulative cost. In block 730, the vehicle may be controlled in accordance with the learned control policy to perform the vehicle operation.

Figure 7:
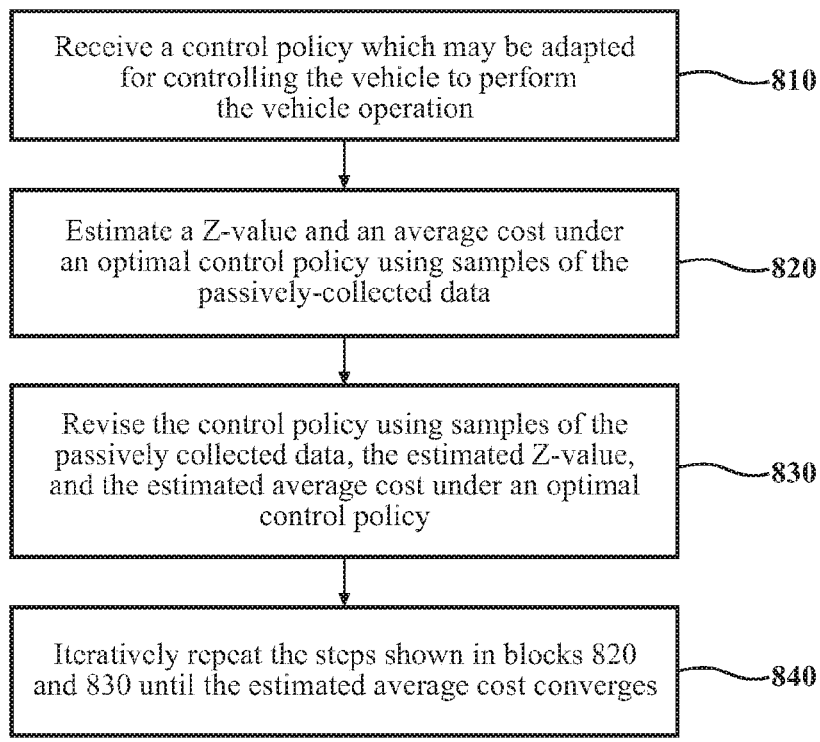
FIG. 7 is a flow diagram illustrating application of a passive actor-critic (PAC) reinforcement learning method in accordance with an embodiment described herein.

FIG. 7 is a flow diagram illustrating application of a passive actor-critic (PAC) reinforcement learning method in accordance with an embodiment described herein, as shown in block 720 of FIG. 6.

Referring to FIG. 7, in block 810, the computing system may receive an initial control policy which may be adapted for controlling the vehicle to perform the vehicle operation. Parameters of the initial version of the control policy may be initialized to random values using a randomization routine in the computing system.

In block 820, the computing system may estimate a Z-value and an average cost under an optimal control policy as previously described, using samples of the passively collected data. In block 830, the computing system may revise the control policy using samples of the passively collected data, the estimated Z value, and the estimated average cost under an optimal policy. In block 840, the computing system may iteratively repeat the steps shown in blocks 820 and 830 until the estimated average cost converges.

Figure 8:
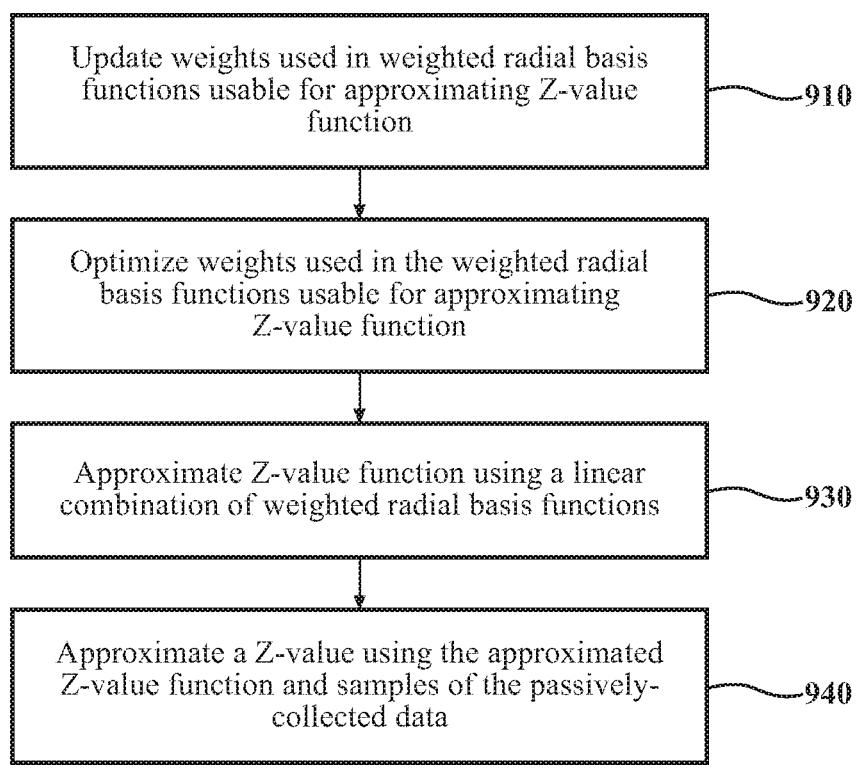
FIG. 8 is a flow diagram illustrating application of a passive actor-critic (PAC) reinforcement learning method steps by a critic network, to estimate a Z-value and an average cost under an optimal control policy using samples of the passively collected data as shown in block 820 of FIG. 7.

FIG. 8 is a flow diagram illustrating application of a passive actor-critic (PAC) reinforcement learning method steps by a critic network, to estimate a Z-value and an average cost under an optimal control policy using samples of the passively collected data, as shown in block 820 of FIG. 7.

In block 910, weights used in weighted radial basis functions which are usable for approximating the Z-value function may be updated. In block 920, weights used in the weighted radial basis functions which are usable for approximating Z-value function, may be optimized. In block 930, a Z-value function may be approximated using a linear combination of the weighted radial basis functions. In block 940, a Z-value may be approximated using samples of the passively-collected data and the approximated Z-value function determined in block 930.

Figure 9:
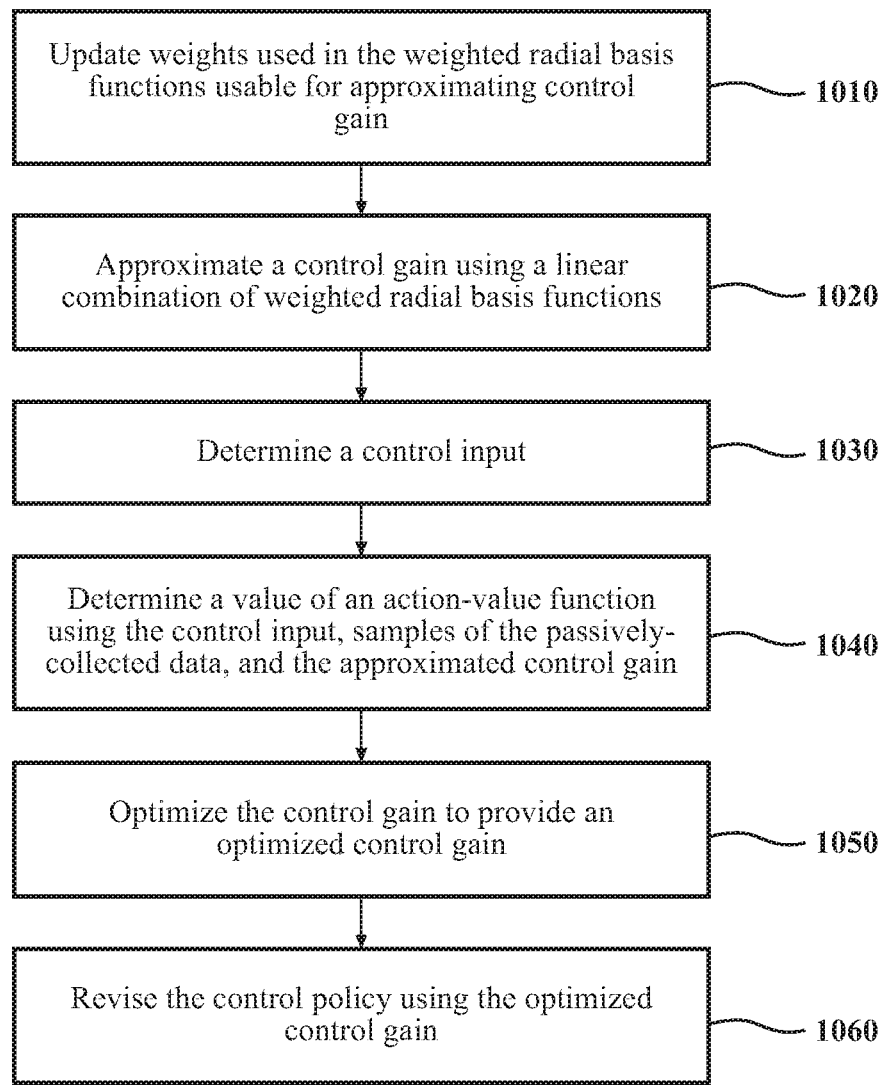
FIG. 9 is a flow diagram illustrating application of a passive actor-critic (PAC) reinforcement learning method steps by an actor network, to estimate a Z-value and an average cost under an optimal control policy using samples of the passively collected data, as shown in block 830 of FIG. 7.

FIG. 9 is a flow diagram illustrating application of a passive actor-critic (PAC) reinforcement learning method steps by an actor network, to estimate a Z-value and an average cost under an optimal control policy using samples of the passively collected data, as shown in block 830 of FIG. 7.

In block 1010, weights used in weighted radial basis functions that are usable for approximating control gain, may be updated. In block 1020, a control gain $\rho(x_k)$ may be approximated using a linear combination of the weighted radial basis functions. The control gain may be approximated using samples of the passively-collected data and the relationship (12) previously described:

$$\rho(x;\mu) \approx \hat{\rho}(x;\mu) := \sum_{j}^{M} \mu_j g_j(x) \quad (12)$$

In block 1030, a control input u may be determined using the relationship $u_k \approx -\hat{\rho}_k B_k^T \hat{V}_k$. In block 1040, a value of an action-value function Q may be determined using the control input determined in block 1030, samples of the passively-collected data, and the control gain $\rho(x_k)$ approximated in block 1020. The value of the action-value function Q may be determined using the relationship $$\hat{Q}_k \approx q_k \Delta t + \frac{0.5\Delta t}{\rho_k} u_k^T u_k + \hat{V}(x_{k+1} + B_k u_k \Delta t)$$

set forth previously. In block 1050, the control gain may be optimized to provide an optimized control gain. The control gain may be optimized using the value of the action-value function Q determined in block 1040 and the relationship:

$$\rho = \min_\mu \frac{1}{2} \sum_D (\hat{Q}_k - V_k^* - V_{avg}^*)^2$$

In block 1060, the control policy may be revised or updated using the latest optimized control gain $\rho(x_k)$ and the relationship (7):

$$\pi^*(x_k) = -\rho(x_k)B(x_k)^T V_{x_k},$$

The steps performed by the critic and actor networks as described above may be iteratively repeated for additional passively-collected data until the estimated average cost converges.

Figure 2:
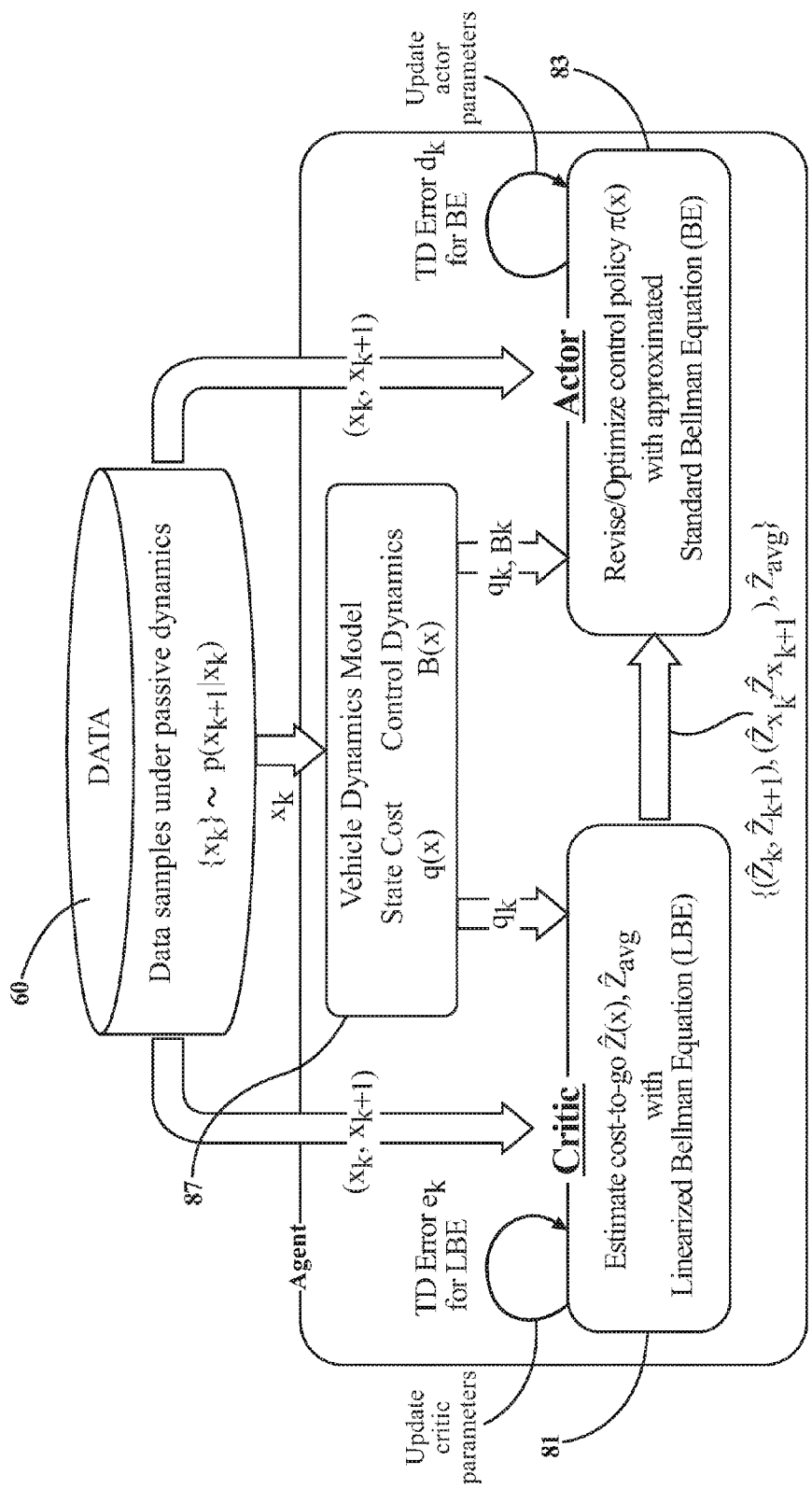
FIG. 2 is a schematic diagram illustrating an information flow during determination of vehicle control inputs and/or revision or optimization of a control policy, in accordance with a method described herein.

FIG. 2 is a schematic diagram showing information flow during determination of control inputs and execution of control policy revisions and control policy optimization in computing system 14, in accordance with a method described herein. While a conventional actor-critic method may operate using samples of data collected actively from the environment, the pAC method described herein determines an optimal control policy without active exploration of the environment, instead using samples collected passively and a known vehicle control dynamics model. Any information received in either the critic 81 or the actor 83 may be buffered in a memory for later use. For example, in a situation where all of the information needed for the critic or actor to calculate or estimate a parameter value is not currently available, the received information may be buffered until the remaining required information is received. The terms $\hat{Z}_{x_k}$ and $\hat{Z}_{x_{k+1}}$ are partial derivatives of the Z-value function with respect to x at $x_k$ and $x_{k+1}$, respectively. The term $\hat{Z}_x^k$ may be used to calculate a partial derivative of the cost-to-go function V at $x_k$.

Figure 3:
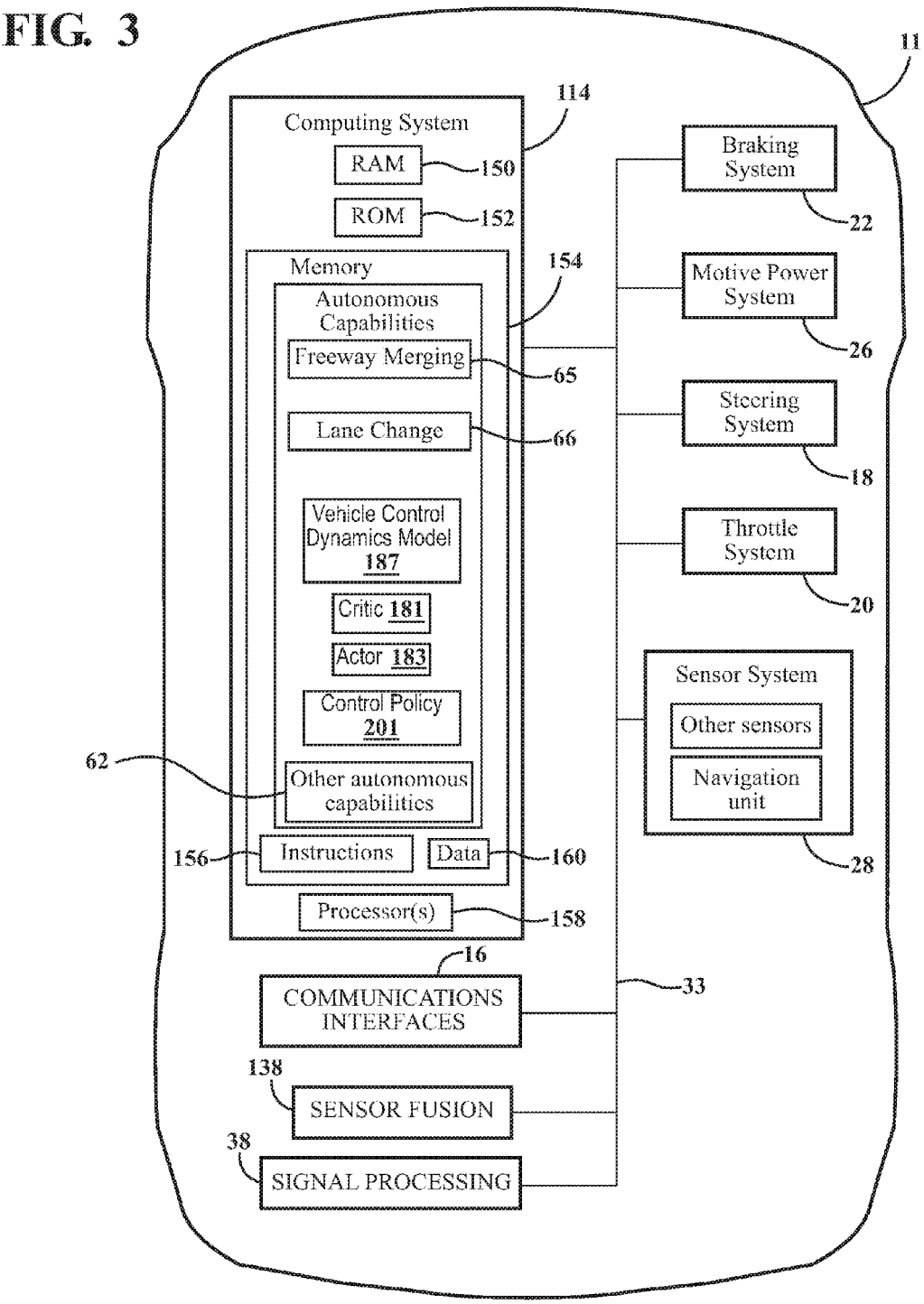
FIG. 3 is a schematic block diagram of a vehicle configured for autonomous control using one or more control inputs and a control policy, and incorporating a computing system configured for determining control inputs to the vehicle and for revising and/or optimizing an autonomous vehicle operation control policy, in accordance with an embodiment described herein.

FIG. 3 is a functional block diagram illustrating a vehicle 11 in accordance with an example embodiment, incorporating a computing system 114 configured in a manner similar to computing system 114 of FIG. 1. The vehicle 11 may take the form of a car, truck, or any other vehicle capable of performing the operations described herein. The vehicle 11 may be configured to operate fully or partially in an autonomous mode. While operating in an autonomous mode, the vehicle 11 may be configured to operate without human interaction. For example, in an autonomous mode in which a freeway merging operation is being executed, the vehicle may operate the throttle, braking and other systems so as to maintain a safe distance from vehicles on the freeway, to match speeds with the other vehicles, etc., without input from a vehicle occupant.

The vehicle 11 may include various systems, subsystems and components in addition to computing system 114 and in operative communication with each other, such as a sensor system or array 28, one or more communications interfaces 16, a steering system 18, a throttle system 20, a braking system 22, a power supply 30, a motive power system 26, and other systems and components needed for operating the vehicle as described herein. The vehicle 11 may include more or fewer subsystems than those shown in FIG. 3, and each subsystem could include multiple elements. Further, each of the subsystems and elements of vehicle 11 may be interconnected. Performance of one or more of the described functions and/or autonomous operations of the vehicle 11 may be executed by multiple vehicle systems and/or components operating in conjunction with each other.

The sensor system 28 can include any suitable type of sensor. Various examples of different types of sensors will be described herein. However, it will be understood that the embodiments are not limited to the particular sensors described.

The sensor system 28 may include a number of sensors configured to sense information about an external environment of the vehicle 11. For example, the sensor system 28 may include a navigation unit such as a Global Positioning System (GPS) and other sensors, for example, an inertial measurement unit (IMU) (not shown), a RADAR unit (not shown), a laser rangefinder/LIDAR unit (not shown), and one or more cameras (not shown) comprising devices configured to capture a plurality of images of the interior of the vehicle and/or an external environment of the vehicle 11. The camera(s) may be still cameras or video cameras. The IMU may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the vehicle 11. To this end, the navigation unit may include a one or more transceivers, including a transceiver operable to provide information regarding the position of the vehicle 11 with respect to Earth. The navigation unit may also be configured to determine or plan a driving route from a given start point (for example, a current location of the vehicle) to a selected destination, using stored and/or available maps, in a manner known in the art. Also, one or more sensors may be provided which are configured to detect the proximity, distance, speed, and other information relating to vehicles moving adjacent or within a certain distance of the vehicle 11.

In a known manner, the vehicle sensors 28 provide data used by the computing system 114 in formulating and executing suitable control commands for the various vehicle systems. For example, data from inertial sensors, wheel speed sensors, road condition sensors, and steering angle sensors may be processed in formulating and executing a command in steering system 18 to turn the vehicle. Vehicle sensors 28 may include any sensors required to support any driver assistance capabilities and autonomous operational capabilities incorporated into the vehicle 11. In arrangements in which the sensor system 28 includes a plurality of sensors, the sensors can work independently from each other. Alternatively, two or more of the sensors can work in combination with each other. Sensors of the sensor system 28 can be operatively connected to the computing system 114 and/or any other element of the vehicle 11.

Any data collected by vehicle sensors 28 may also be transmitted to any vehicle system or component requiring or utilizing the data for the purposes described herein. For example, the data collected by vehicle sensors 28 may be transmitted to computing system 114, or to one or more specialized system or component controllers (not shown). Additional particular types of sensors may include any other types of sensors needed to perform the functions and operations described herein.

Information from particular vehicle sensors may be processed and used to control more than one vehicle system or component. For example, in a vehicle incorporating both automated steering and braking control, various road condition sensors may provide data to the computing system 114 to enable the computing system to process the road condition information in accordance with stored processor-executable instructions, and to formulate appropriate control commands to both the steering system and braking system.

The vehicle 11 may include a suitable signal processing means 38 for situations where a sensor output signal or other signal requires pre-processing prior to use by the computing system 114 or another vehicle system or element, or where a control signal sent from the computing system will require processing prior to use by actuatable sub-systems or sub-system components (for example, components of the steering system or throttle system). The signal processing means may be an analog-to-digital (A/D) converter or digital-to-analog (D/A) converter, for example.

A sensor fusion capability 138 may be in the form of an algorithm (or a computer program product storing an algorithm) configured to accept data from the sensor system 28 as an input. The data may include, for example, data representing information sensed at the sensors of the sensor system 28. The sensor fusion algorithm may process data received from the sensor system to generate an integrated or composite signal (formed, for example, from outputs of multiple individual sensors). The sensor fusion algorithm 138 may include, for instance, a Kalman filter, a Bayesian network, or another algorithm. The sensor fusion algorithm 138 may further provide various assessments based on data from the sensor system 28. In an example embodiment, the assessments may include evaluations of individual objects or features in the environment of the vehicle 11, evaluation of a particular situation, and evaluation of possible impacts based on the particular situation. Other assessments are also possible. The sensor fusion algorithm 138 may be stored on a memory (such as memory 154) incorporated into or in operative communication with computing system 114, and may be executed by the computing system in a manner known in the art.

The use of "continuously" when referring to the reception, gathering, monitoring, processing, and/or determination of any information or parameters described herein means that the computing system 114 is configured to receive and/or process any information relating to these parameters as soon as the information exists or is detected, or as soon as possible in accordance with sensor acquisition and processor processing cycles. As soon as the computing system 114 receives data from sensors or information relating to the status of a vehicle component for example, the computing system may act in accordance with stored programming instructions. Similarly, the computing system 114 may receive and process an ongoing or continuous flow of information from sensor system 28 and from other information sources. This information is processed and/or evaluated in accordance with instructions stored in a memory, in a manner and for the purposes described herein.

FIG. 3 also illustrates a block diagram of an exemplary computing system 114 configured in a manner similar to computing system 114 of FIG. 1, as previously described. As well as incorporating the features needed for performing the policy revisions and determining control inputs as described herein, the computing system 114 may be operatively connected to the other vehicle systems and elements and otherwise configured so as to affect control and operation of the vehicle 11 and its components. The computing system 114 may be configured to control at least some systems and/or components autonomously (without user input) and/or semi-autonomously (with some degree of user input). The computing system may also be configured to control and/or execute certain functions autonomously and/or semi-autonomously. The computing system 114 may control the functioning of the vehicle 11 based on inputs and/or information received from various subsystems (e.g., motive power system 26, sensor system 28, steering system 18, etc.), from any of the communications interfaces 16, and/or from any other suitable source of information.

In the embodiment of FIG. 3, the computing system 114 may include a vehicle control dynamics model 187, a critic 181, an actor 183, and a control policy 201 as previously described with respect to FIG. 1. The computing system 114 may be configured for determining control inputs and revising and/or optimizing an autonomous vehicle operation control policy as previously described. The computing system 114 may also be configured for controlling the vehicle to perform a desired operation in accordance with a control input and also in accordance with a revised or optimized control policy as described herein.

The computing system 114 may have some or all of the elements shown in FIG. 3. In addition, the computing system 114 may also include additional components as needed or desired for particular applications. The computing system 114 may also represent or be embodied in a plurality of controllers or computing devices that may process information and/or serve to control individual components or sub-systems of the vehicle 11 in a distributed fashion.

The memory 154 may contain data 160 and/or instructions 156 (e.g., program logic) executable by the processor(s) 158 to execute various functions of the vehicle 11. The memory 154 may contain additional instructions as well, including instructions to transmit data to, receive data from, interact with, or control one or more of the vehicle systems and/or components described herein (for example, motive power system 26, sensor system 28, computing system 114, and the communication interfaces 16). In addition to the instructions 156, the memory 154 may store data such as roadway maps, path information, among other information. Such information may be used by the vehicle 11 and the computer system 114 for route planning and otherwise during the operation of the vehicle 11 in autonomous, semi-autonomous, and/or manual modes.

The computing system 114 may be configured to coordinate control of the various actuatable vehicle systems and components so as to implement one or more autonomous capabilities or operations (generally designated 62). These autonomous capabilities 62 may be stored in memory 154 and/or in other memories and implemented in the form of computer-readable program code that, when executed by a processor, implement one or more of the various processes, instructions or functions described herein.

Communications interfaces 16 may be configured to enable interaction between the vehicle 11 and external sensors, other vehicles, other computer systems, various external messaging and communications systems (such as a satellite system, a cellular phone/wireless communication system, various vehicle service centers as described herein, etc.) and/or a user. The communications interfaces 16 may include a user interface (for example, one or more displays (not shown), voice/audio interfaces (not shown) and/or other interfaces) for providing information to or receiving input from a user of the vehicle 11.

The communications interfaces 16 may also include interfaces enabling communication in a wide area network (WAN), a wireless telecommunications network, and/or any other suitable communications networks. The communication network(s) can include wired communication links and/or wireless communication links. The communication network(s) can include any combination of the above networks and/or other types of networks. The communication network(s) can include one or more routers, switches, access points, wireless access points, and/or the like. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and the vehicle 11 and any nearby roadside communications nodes and/or infrastructure.

When used in a WAN networking environment, the computing system 114 may include (or be operatively connected to) a modem or other means for establishing communications over the WAN, such as network (e.g., the Internet).

When used in a wireless telecommunications network, the computing system 114 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving a constant flow of information from various external sources.

The vehicle 11 may include various actuatable sub-systems and elements in operative communication with computing system 114 and other vehicle systems and/or components, and which are operable responsive to control commands received from the computing system. Various actuatable sub-systems and elements may be controlled manually or automatically (by computing system 114) depending on such factors as a given driving situation, which autonomous driving assistance systems (for example, ACC and/or lane keeping) are activated, and/or whether the vehicle is being driven in a fully autonomous mode.

The steering system 18 may include such elements as the vehicle wheels, rack-and-pinion steering gears, steering knuckles, and/or any other elements or combination of elements (including any computer system-controllable mechanisms or elements) that may be operable to adjust the heading of vehicle 11. The motive power system 26 may include components operable to provide powered motion for the vehicle 11. In an example embodiment, the motive power system 26 may include an engine (not shown), an energy source (such as gasoline, diesel fuel, or a one or more electric batteries in the case of a hybrid vehicle), and a transmission (not shown). The braking system 22 could include any combination of elements and/or any computer system-controllable mechanisms configured to decelerate the vehicle 11. The throttle system may include elements and/or mechanisms (for example, an accelerator pedal and/or any computer system-controllable mechanisms configured to control, for instance, the operating speed of the engine and, in turn, control the speed of the vehicle 11. FIG. 3 shows just a few examples of vehicle sub-systems 18, 20, 22, 26 which may be incorporated into a vehicle. A particular vehicle may incorporate one or more of these systems or other systems (not shown) in addition to one or more of the systems shown.

The vehicle 11 may be configured so that the computing system 114, sensor system 28, actuatable sub-systems 18, 20, 22, 26 and other systems and elements thereof can communicate with each other using a controller area network (CAN) bus 33 or the like. Via the CAN bus and/or other wired or wireless mechanisms, the computing system 114 may transmit messages to (and/or receive messages from) the various vehicle systems and components. Alternatively, any of the elements and/or systems described herein may be directly connected to each other without the use of a bus. Also, connections between the elements and/or systems described herein may be through another physical medium (such as wired connections), or the connections may be wireless connections. Although FIG. 3 shows various components of vehicle 11 such as computing system 114, memory 154, and communications interfaces 16, as being integrated into the vehicle 11, one or more of these components could be mounted or associated separately from the vehicle 11. For example, memory 154 could, in part or in full, exist separately from the vehicle 11. Thus, the vehicle 11 could be provided in the form of device elements that may be located separately or together. The device elements that make up vehicle 11 could be communicatively coupled together in a wired or wireless fashion. Thus, in another aspect, and as described herein, the computing system 114 may be configured for optimizing a control policy usable for autonomously controlling a vehicle to perform a vehicle operation. The computing system 114 may include one or more processors 158 for controlling operation of the computing system 114, and a memory 154 for storing data and program instructions usable by the one or more processors. The memory 154 may be configured to store computer code that, when executed by the one or more processors, causes the one or more processors 158 to (a) receive passively collected data relating to the system; (b) determine a Z-value function usable for estimating a cost-to-go for the vehicle; (c) in a critic network in the computing system, determine a Z-value using the Z-value function and samples of the passively-collected data, and estimate an average cost under an optimal policy using samples of the passively-collected data; (d) in an actor network in the computing system, revise the control policy using samples of the passively-collected data, a control dynamics for the system, a cost-to-go, and a control gain; and (e) iteratively repeating steps (c) and (d) until the estimated average cost converges.

EXAMPLE

Referring to FIGS. 4 and 5, in one example of implementation of an embodiment of the pAC reinforcement learning method described herein, an autonomous freeway merging operation is simulated. Passively-collected data relating to the freeway merging operation is processed as previously described to learn a control policy configured and optimized for controlling the vehicle so as to perform the vehicle operation with a minimum expected cumulative cost. The vehicle may then be controlled in accordance with the learned control policy to perform the freeway merging operation.

The freeway merging operation may have a four-dimensional state space and a one-dimensional action space. The passive dynamics $A(x_t)$ of the vehicle environment dynamics and the vehicle control dynamics $B(x)$ may be expressed as:

$$x = [dx_{12}, dv_{12}, dx_{02}, dv_{02}]^T,$$

$$A(x) = [dx_{12}, 0, dv_{02}, +0.5\alpha_0(x)\Delta t, \alpha_0(x)]^T$$

$$B(x) = [0.5\Delta t, 1, 0, 0]^T, C(x) = [0, 2.5, 0, 2.5]^T$$

$$\alpha_0(x) = \alpha \frac{v_2^\beta(-dv_{02})}{-dx_{02}^\gamma}, \Delta t = 0.1[\text{sec}]$$

where the subscript "0" denotes the vehicle labeled "0" that is behind the merging vehicle on the freeway's rightmost lane (referred to as the "following vehicle"), the subscript "1" denotes the vehicle labeled "1" which is the merging automated vehicle on the ramp RR, and the subscript "2" denotes the vehicle labeled "2" (also referred to as the "leading vehicle") that is in front of the merging vehicle 1 on the right-most lane of the freeway. $dx_{12}$ and $dv_{12}$ denote the merging vehicle's relative position and velocity from the leading vehicle, and the term $\alpha_0(x)$ represents the acceleration of the following vehicle 0. The parameters $\alpha$, $\beta$, and $\gamma$ are model parameters (for example, as used in the Gazis-Herman-Rothery (GHR) family of car-following models) which may be tuned to approximate human driving behaviors in traffic environments. For purposes of the example, it is assumed that the leading vehicle is driven with constant speed $v_2$=30 meters/sec and that a vehicle control dynamics model for the following vehicle is known. If the following vehicle's velocity is slower than that of the leading vehicle, ($dv_{02}$<0), $\alpha$=1.55, $\beta$=1.08, $\gamma$=1.65; otherwise $\alpha$=2.15, $\beta$=−1.65, $\gamma$=−0.89.

The state cost q(x) may be expressed as:

$$q(x) = k_1\left(1.0 - \exp\left(-k_2\left(1 - \frac{2dx_{12}}{dx_{02}}\right)^2 - k_3(dv_{10})^2\right)\right)$$

where $k_1$, $k_2$ and $k_3$ are weights for the state cost; if the merging vehicle is between the following and leading vehicles on the ramp (i.e., in a condition where $dx_{12}$<0 and $dx_{12}$>$dx_{02}$), $k_1$=1, $k_2$=10 and $k_3$=10; otherwise $k_1$=10, $k_2$=10 and $k_3$=0. The weights k1, k2, k3 for the state cost may be assigned or tuned manually. Alternatively, the state cost function may be learned from a collected dataset using inverse reinforcement learning. The cost is designed to motivate the automated car to merge midway between the following and leading vehicles with the same velocity as the following vehicle. Initial states were randomly selected within the ranges −100<$dx_{12}$<100 meters, −10<$dv_{12}$<10 meters/sec, −100<$dx_{02}$<−5 meters, and −10<$dx_{02}$<10 meters/sec. Gaussian radial basis functions were used to approximate the Z-value:

$$fi(x) = \exp(-\frac{1}{2}(x-m_i)^T Si(x-m_i))$$

where mi and Si are the mean and inverse covariance for the i-th radial basis function. For the freeway merging simulation, the Z-value was approximated with 4,096 Gaussian radial basis functions whose means were set on vertices of a grid composed of 8 values per dimension of state. The standard deviations of the bases were 0.7 of the distance between the closest two bases in each dimension. A value of g(x)=1 was used to estimate control gain ρ(x) because the actual value of ρ(x) is constant in the example. The optimal policy was determined using Equation (7), as previously described. The method optimized a policy from 10,000 samples collected by simulating the passive dynamics. FIG. 5 shows the rate of merging successfully in 30 seconds (expressed as the number of iterations required for convergence) starting from 125 different initial states, using successive control inputs determined by the methods described herein.

The state cost function may be designed or tuned to fit particular merging situations. In one or more embodiments, a computing system may be programmed to use inverse reinforcement learning to learn a state cost function for a particular merging situation.

As will be appreciated by one skilled in the pertinent art upon reading the disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. In addition, various signals representing data, instructions or events as described herein may be transferred between a source and a destination in the form of electromagnetic waves traveling through signal-conducting media such as metal wires, optical fibers, and/or wireless transmission media (e.g., air and/or space).

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, reference should be made to the following claims, rather than to the foregoing specification, as indicating the scope of the invention.

What is claimed is:

1. A computer-implemented method for autonomously controlling a vehicle to perform a vehicle operation, the method comprising steps of:
   applying a passive actor-critic reinforcement learning method to passively-collected data relating to the vehicle operation, to adapt an existing control policy so as to enable control of the vehicle by the control policy so as to perform the vehicle operation with a minimum expected cumulative cost, the step of applying a passive actor-critic reinforcement learning method to passively-collected data including steps of:
   a) in a critic network, estimating a Z-value and an average cost under an optimal control policy using samples of the passively collected data;
   b) in an actor network operatively coupled to the critic network, revising the control policy using samples of the passively collected data, the estimated Z-value, and the estimated average cost under an optimal control policy from the critic network; and
   c) iteratively repeating steps (a)-(b) until the estimated average cost converges; and
   controlling the vehicle in accordance with the adapted control policy to perform the vehicle operation.

2. The method of claim 1 wherein the vehicle operation is an operation for merging the vehicle into a traffic lane between a second vehicle and a third vehicle traveling in the traffic lane, and wherein the control policy is configured for controlling the vehicle to merge the vehicle midway between the second vehicle and the third vehicle.

3. The method of claim 1 wherein the Z-value is estimated using a linearized version of a Bellman equation.

4. The method of claim 1 wherein the step of estimating the average cost under an optimal policy comprises the step of, prior to the step of revising the control policy, updating the average cost.

5. The method of claim 1 wherein the step of estimating a Z-value comprises the steps of:
   approximating a Z-value function using a linear combination of weighted radial basis functions; and
   approximating a Z-value using the approximated Z-value function and samples of the passively-collected data.

6. The method of claim 5 wherein the step of approximating a Z-value function using a linear combination of weighted radial basis functions comprises the step of optimizing weights used in the weighted radial basis functions.

7. The method of claim 6 wherein the step of approximating a Z-value function using a linear combination of weighted radial basis functions comprises the step of, prior to the step of optimizing the weights, updating the weights used in the weighted radial basis functions.

8. The method of claim 1 wherein the step of revising the control policy comprises steps of:
   approximating a control gain;
   optimizing the control gain to provide an optimized control gain; and
   revising the control policy using the optimized control gain.

9. The method of claim 8 further comprising the steps of, prior to optimizing the control gain:
   determining a control input; and
   determining a value of an action-value function using the control input, samples of the passively-collected data, and the approximated control gain.

10. The method of claim 8 wherein the step of approximating a control gain comprises the step of approximating the control gain using a linear combination of weighted radial basis functions.

11. The method of claim 10 further comprising the step of, prior to the step of approximating the control gain using a linear combination of weighted radial basis functions, updating weights used in the weighted radial basis functions.

12. A computer-implemented method for optimizing a control policy usable for controlling a system to perform an operation, the method comprising steps of:
   providing a control policy usable for controlling the system; and
   applying a passive actor-critic reinforcement learning method to passively-collected data relating to the operation to be performed, to revise the control policy such that the control policy is operable to control the system to perform the operation with a minimum expected cumulative cost, wherein the step of applying a passive actor-critic reinforcement learning method to passively-collected data includes steps of:
   a) in a critic network, estimating a Z-value using samples of the passively-collected data, and estimating an average cost under an optimal policy using samples of the passively-collected data;

b) in an actor network, revising the control policy using samples of the passively-collected data, a control dynamics for the system, a cost-to-go, and a control gain;
c) updating parameters used in revising the control policy and in estimating the Z-value and the average cost under an optimal policy; and
d) iteratively repeating steps (a)-(c) until the estimated average cost converges.

13. A computing system configured for optimizing a control policy usable for autonomously controlling a vehicle to perform a vehicle operation, the computing system including one or more processors for controlling operation of the computing system, and a memory for storing data and program instructions usable by the one or more processors, wherein the memory is configured to store computer code that, when executed by the one or more processors, causes the one or more processors to:

a) receive passively-collected data relating to the vehicle operation;
b) determine a Z-value function usable for estimating a cost-to-go for the vehicle;
c) in a critic network in the computing system:
   c1) determine a Z-value using the Z-value function and samples of the passively-collected data;
   c2) estimate an average cost under an optimal policy using samples of the passively-collected data
d) in an actor network in the computing system, revise the control policy using samples of the passively-collected data; a control dynamics for the vehicle; a cost-to-go, and a control gain; and
e) iteratively repeat steps (c) and (d) until the estimated average cost converges.

* * * * *

UNITED STATES PATENT AND TRADEMARK OFFICE
CERTIFICATE OF CORRECTION

PATENT NO. : 10,061,316 B2  
APPLICATION NO. : 15/594020  
DATED : August 28, 2018  
INVENTOR(S) : Tomoki Nishi Page 1 of 1

It is certified that error appears in the above-identified patent and that said Letters Patent is hereby corrected as shown below:

In the Specification

Column 7, Line 37:  
Delete: "$r(x_k,u_k):=q(x_k)+KL(p(x_{k+1}|k_k)||p(x_{k+1}|x_k,u_k))$ (3)"  
And Insert: -- $r(\mathrm{x}_k, \mathrm{u}_k) := q(\mathrm{x}_k) + KL(p(\mathrm{x}_{k+1}|\mathrm{x}_k)||p(\mathrm{x}_{k+1}|\mathrm{x}_k, \mathrm{u}_k))$ (3) --

Column 7, Line 39:  
Delete: "$p(x_{k+1}|x_k)=0 \Rightarrow \forall u_k, p(x_{k+1}|k_k, u_k)=0$ (4)"  
And Insert: -- $p(\mathrm{x}_{k+1}|\mathrm{x}_k) = 0 \Rightarrow \forall u_k, p(\mathrm{x}_{k+1}|\mathrm{x}_k, \mathrm{u}_k) = 0$ (4) --

Column 7, Line 60:  
Delete: "$p(x_{k+1} | x_k, \pi_k^*) = \dfrac{p(X_{k+1} | X_k)Z(x_{k+1})}{\mathcal{G}[Z](x_{k+1})}$,"  
And Insert: -- $p(\mathrm{x}_{k+1}|\mathrm{x}_k, \pi_k^*) = \dfrac{p(\mathrm{x}_{k+1}|\mathrm{x}_k)Z(\mathrm{x}_{k+1})}{\mathcal{G}[Z](\mathrm{x}_{k+1})}$, --

Column 8, Line 15:  
Delete: "$\pi^* = -\rho(x_k)B(x_k)^T V_{x_k}$, (7)"  
And Insert: -- $\pi^*(\mathrm{x}_k) = -\rho(\mathrm{x}_k)B(\mathrm{x}_k)^\top V_{\mathrm{x}_k}$, (7) --

Column 13, Line 50:  
Delete: "$\hat{Q}_k \approx q_k \Delta t + \dfrac{0.5\Delta t}{\rho_k} u_k^T u_k + \hat{V}(x_{k+1} + B_k u_k \Delta t)$"  
And Insert: -- $\hat{Q}_k \approx q_k \Delta t + \dfrac{0.5\Delta t}{\hat{\rho}_k} \mathbf{u}_k^\top \mathbf{u}_k + \hat{V}(\mathbf{x}_{k+1} + B_k \mathbf{u}_k \Delta t)$ --

Signed and Sealed this  
Sixteenth Day of June, 2020

Andrei Iancu  
*Director of the United States Patent and Trademark Office*